(12) United States Patent
Liu et al.

(10) Patent No.: US 8,700,465 B1
(45) Date of Patent: Apr. 15, 2014

(54) DETERMINING ONLINE ADVERTISEMENT STATISTICS

(75) Inventors: Dan Liu, Sunnyvale, CA (US); Marc Berndl, San Francisco, CA (US); Karthik Gopalratnam, San Francisco, CA (US); Amir Najmi, San Francisco, CA (US); Diane L. Tang, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 208 days.

(21) Appl. No.: 13/161,195

(22) Filed: Jun. 15, 2011

(51) Int. Cl.
*G06Q 30/00* (2012.01)

(52) U.S. Cl.
USPC .................................................... 705/14.52

(58) Field of Classification Search
USPC .................................................... 705/14
See application file for complete search history.

(56) References Cited

U.S. PATENT DOCUMENTS

| | | |
|---|---|---|
| 2008/0046411 A1 | 2/2008 | Lee |
| 2008/0294577 A1* | 11/2008 | Agarwal .................. 706/12 |
| 2010/0138452 A1 | 6/2010 | Henkin et al. |
| 2010/0241506 A1 | 9/2010 | Kim |
| 2011/0106611 A1 | 5/2011 | Chang et al. |
| 2011/0196733 A1 | 8/2011 | Li et al. |
| 2011/0246286 A1* | 10/2011 | Cetin et al. ................. 705/14.42 |
| 2011/0258033 A1* | 10/2011 | Gollapudi et al. .......... 705/14.42 |
| 2011/0264511 A1* | 10/2011 | Zhang ........................ 705/14.43 |

* cited by examiner

*Primary Examiner* — Matthew L Hamilton
(74) *Attorney, Agent, or Firm* — Fish & Richardson P.C.

(57) ABSTRACT

Technologies relating to determining online advertisement statistics are described. In general, one aspect of the subject matter described in this specification can be embodied in a method that includes receiving a prediction value for a click-through rate for an online advertisement, the prediction value indicating a probability that the online advertisement will be accessed when displayed in an online medium, the prediction value based on a ratio of a number of times the advertisement has been accessed by users to a number of times the advertisement has been displayed to users, identifying at least one condition that is present when the online advertisement is to be displayed, the condition affecting accuracy of the prediction value, and generating a corrected prediction value based on at least one stored shift value associated with the at least one condition.

24 Claims, 7 Drawing Sheets

| Advertisement ⌐302 | Predicted ⌐304 | Actual ⌐306 | Condition ⌐308 |
|---|---|---|---|
| Ad1 | 50% | 40% | US |
| Ad2 | 40% | 30% | US |
| Ad3 | 30% | 20% | US |
| Ad1 | 50% | 60% | UK |
| Ad2 | 40% | 70% | UK |

DETERMINING ONLINE ADVERTISEMENT STATISTICS

TECHNICAL FIELD

The present disclosure relates to determining and/or adjusting online advertisement statistics.

BACKGROUND

Online content can include web pages and advertisements displayed with the web pages. An online advertisement service can provide online advertisements on behalf of advertisers and measure statistics about the advertisements. For example, the online advertisement service might measure and record statistics about how often an advertisement displayed on web pages is clicked by a user viewing the web pages. The presence of real-world conditions may affect the way in which the user interacts with advertisements, and so the statistics may vary in accuracy depending on the presence of such conditions.

SUMMARY

Technologies relating to adjusting online advertisement statistics are described herein.

In general, one aspect of the subject matter described in this specification can be embodied in a method that includes receiving a prediction value for a click-through rate for an online advertisement, the prediction value indicating a probability that the online advertisement will be accessed when displayed in an online medium, the prediction value based on a ratio of a number of times the advertisement has been accessed by users to a number of times the advertisement has been displayed to users, identifying at least one condition that is present when the online advertisement is to be displayed, the condition affecting accuracy of the prediction value, and generating a corrected prediction value based on at least one stored shift value associated with the at least one condition.

Other embodiments of this aspect include corresponding system, apparatus, and computer program products.

These and other embodiments can each optionally include one or more of the following features. The corrected prediction value differs from the prediction value by a quantity independent of the prediction value. The corrected prediction value differs from the prediction value by a quantity that depends upon a quantity of the prediction value. The online advertisement includes a hyperlink, and the probability that the online advertisement will be accessed includes a probability that the hyperlink will be clicked, and the number of times the advertisement has been accessed by users includes the number of times the advertisement has been clicked by users. Generating the corrected prediction value includes adjusting the prediction value based on a value f1 used to uniformly adjust the prediction value associated with the online advertisement independent of a quantity associated with the prediction value, and a value f2 used to adjust the prediction value based on a particular quantity associated with the prediction value. Adjusting the prediction value (X) includes calculating a new prediction value (X_corrected) using the following equation: $X\_corrected = X * e^{f1} * X^{f2}$. The at least one condition includes at least one of a physical location at which the online advertisement is displayed, a location within a web page at which the online advertisement is displayed, a time of day at which the online advertisement is displayed, a characteristic of text of the online advertisement, a characteristic of search results associated with the particular advertisement, and relevance of the advertisement to a keyword used in a search query. The aspect also includes using the corrected prediction value to select an advertisement to display to a user.

In general, another aspect of the subject matter described in this specification can be embodied in a method that includes receiving a set of a prediction values each corresponding to an online advertisement and based on a measured click-through rate when the corresponding online advertisement was displayed in an online medium, identifying at least one condition present when the online advertisements were displayed, receiving a first set of data values each indicating a number of times the advertisements have been accessed by users when the at least one condition occurs, receiving a second set of data values each indicating a number of times the advertisements have been displayed to users when the at least one condition occurs, and based on the prediction values, the first set of data values, and the second set of data values, calculating at least one shift value for adjusting prediction values when the condition is present.

Other embodiments of this aspect include corresponding system, apparatus, and computer program products.

These and other embodiments can each optionally include one or more of the following features. The stored shift value is calculated based on data including a ratio of a first click-through rate occurring when the at least one condition is present and a second click-through rate occurring when the at least one condition is not present, the data collected during prior occurrences of the at least one condition. The stored shift value is calculated based on a regression analysis of data collected during prior occurrences of the at least one condition.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

An online advertising service can predict the likelihood that an online advertisement will be clicked on (e.g., an estimated click-through rate) based on statistics of how other online advertisements have been clicked or acted upon in the past. The prediction can then be used to select an online advertisement that is likely to be clicked when displayed to a user. Generally, an advertisement that is likely to be clicked is valuable to an advertiser, since the advertisement is displayed with the intention of being clicked and leading the user to a product or service offered by the advertiser. The prediction can also be used to make modifications or improvements to an advertisement that is unlikely to be clicked on in its current form. The prediction can also be used to set pricing for the advertisement that corresponds to how likely the advertisement will be clicked on.

The prediction can be made more accurate by accounting for particular conditions that tend to alter the actual likelihood that the online advertisement will be clicked on. The conditions can be identified and statistics about the conditions can be measured and recorded to identify how the conditions affect the rate at which an advertisement is clicked. These conditions may include factors such as the country in which the online advertisement is displayed, the location within a Web page at which the online advertisement is displayed, the time of day at which the online advertisement is displayed, a characteristic of the text of the online advertisement, a characteristic of search results associated with the particular advertisement such as the rank or relevance of the search result, the relevance of the advertisement to a keyword used in a search query, or any other factor for which statistics can be compiled. If the prediction is not adjusted, the conditions are prone to bias or skew the prediction relative to actual results (e.g., the actual click-through rate).

For some conditions, when the condition is present the online advertisement is less likely or more likely to be clicked on than if the condition were not present, causing the prediction to have an optimistic or pessimistic bias, respectively, relative to the actual results. For some conditions, when a condition is present the online advertisement may be both less likely and more likely to be clicked on depending on the actual value of the prediction (for example, a 10% likelihood of being clicked on versus an 80% likelihood of being clicked on), skewing the prediction relative to the actual results. Put another way, bias causes a prediction value to be either more optimistic or more pessimistic based on the presence of a condition, and skew causes a variation in bias among prediction values for the same condition. The effect of bias is independent of the prediction value, and the effect of skew depends upon the prediction value. The rate at which an advertisement is clicked can be predicted with more accuracy by accounting for bias and skew. When the prediction value is corrected by accounting for bias and skew, the corrected prediction value can be used to more accurately select an advertisement to display to the user that is likely to be clicked on by the user. The corrected prediction value can also be used to improve the advertisement or set pricing for the advertisement.

Figure 1:
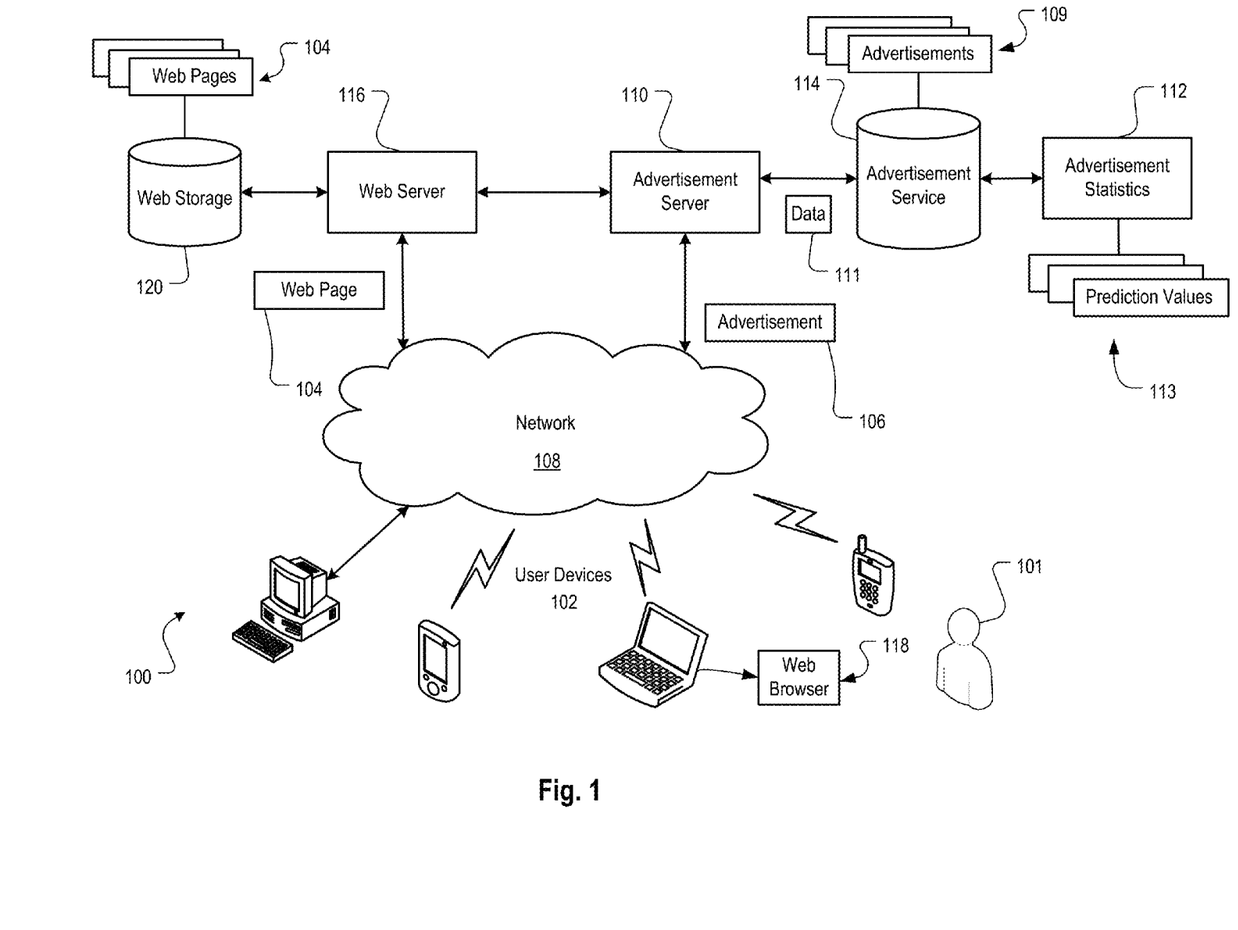
FIG. 1 is a block diagram of an exemplary online environment.

FIG. 1 is a block diagram of an exemplary online environment 100. The online environment 100 facilitates the serving of content items for display on user devices 102. For example, content items can include web pages 104 and advertisements 106 (e.g., advertisements related to the web pages 104). For example, web pages 104 can be provided by a web server 116 for display on a user device 102, and advertisements 106 can be provided by an advertisement server 110 for display on the user device 102 for viewing by a user 101.

Web pages 104 and advertisements 106 can be provided to user devices 102 through the network 108. The network 108 can be a wide area network, local area network, the Internet, or any other public or private network, or combination of both. User devices 102 can connect to the web server 116 (or the advertisement server 110) through the network 108 using any device capable of communicating in a computer network environment and displaying retrieved information. Exemplary user devices 102 include a web-enabled handheld device, a mobile telephone or smartphone, tablet device, a set top box, a game console, a personal digital assistant, a navigation device, or a computer.

The advertisements 106 can be displayed with the web page 104 on a web browser 118 of a user device 102. The advertisements 106 can also be requested as part of the delivery of a web page 104 in response to a user device 102 requesting the web page 104 from a web server 116.

In some implementations, the advertisements 106 are provided directly to the web server 116 by the advertisement server 110, and the web server 116 then provides the advertisements 106 to the user devices 102 in association with one or more particular web pages 104, e.g. web pages which are related to the advertisements 106. In some implementations, the web server 116 queries the advertisement server 110 for advertisements 106 related to one or more particular web pages 104, and the advertisement server 110 evaluates a pool 109 of advertisements and chooses one or more advertisements 106 that are likely to be clicked on if displayed with the web page 104. For example, the advertisement server 110 may have access to statistics 112 maintained by the advertisement service 114 and describing the rate at which advertisements 106 within the pool 109 are clicked by users 101 and use the statistics 112 to estimate or predict the likelihood that an advertisement 106 will be clicked if it is displayed with the web page 104. The statistics may include prediction values 113 which may be each associated with an advertisement 106 in the pool 109 or associated with a category of advertisements in the pool 109, for example. The prediction values 113 indicate a probability that an advertisement 106 will be acted upon by a user (e.g., clicked).

In some implementations, the advertisement service 114 can receive data 111 describing the rate at which advertisements 106 are clicked by users (e.g., users like user 101). For example, the data 111 can be data describing particular instances in which users clicked one or more advertisements 106 and can also describe conditions present when the advertisement or advertisements were clicked. The data 111 can be provided by the web server 116, the advertisement server 110, another component of the online environment 100, or some combination of these things. The data 111 can be used to compile the statistics 112 (e.g., used to generate prediction values 113) and the data 111 can also be used enhance the accuracy and precision of the statistics as more data 111 is collected.

In some implementations, the prediction values 113 each indicate a probability that an advertisement 106 will be clicked on by a user. For example, a prediction value 113 associated with an advertisement 106 may indicate that the advertisement 106 has a 50% chance of being clicked on if the advertisement 106 is displayed to a user 101.

A prediction value 113 indicating a probability that an advertisement 106 will be clicked on by a user can be useful if the probability is accurate in predicting an actual click-through rate (e.g., if the prediction value 113 is close to an actual click-through rate). In some examples, the probability that an advertisement 106 will be clicked can be the actual rate at which the advertisement 106 has been clicked in the past based on the statistics 112. If an advertisement 106 is clicked 50% of the time, the probability that the advertisement 106 will be clicked can be recorded in the statistics 112 as a prediction value 113 of 50%. Thus, the prediction value can be based on a measured click-through rate when the corresponding online advertisement was displayed to a user.

A prediction value 113 can be used to choose an advertisement 106 that is likely to be clicked on when displayed, or the prediction value 113 can be used to determine how well an advertisement is performing (for example, to determine which advertisements should be modified to improve the rate at which the advertisement is clicked). However, the accuracy of the prediction value 113 (e.g., how close the prediction value 113 is to an actual click-through rate) may vary. For example, the accuracy of the prediction value 113 may vary if certain conditions are present in the online environment 100 that can affect the data (e.g., data 111) used to calculate prediction value 113.

In contrast to an impression which occurs when a user views one of the ads (such as when a page of content including the ad is displayed and/or rendered to the user), a click-through may be said to occur when a user selects a presented ad by clicking on the ad, embedded hypertext links, executable code, and/or any type of user selection related to the presented ad, where the click or another type of selection typically directs the user to the advertiser's web site or the advertiser's online or real world presence.

The advertisement service 114 may analyze the data 111 to determine a click-through rate for the advertisements within the advertisement pool 109 (e.g., a group of advertisements associated with a single advertiser). In some examples, the advertisement service 114 can determine the click-through rate of a particular advertisement 106 by dividing the total number of clicks associated with that advertisement 106 by the total number of impressions associated with that advertisement 106. Thus, the click-through rate for an advertisement is a ratio of clicks to impressions for that advertisement. The advertisement service 114 can use the click-through rate to make decisions such as which advertisements to show most frequently and calculate a prediction value 113 that is a predicted click-through rate for future advertisements being displayed to users.

Figure 2:
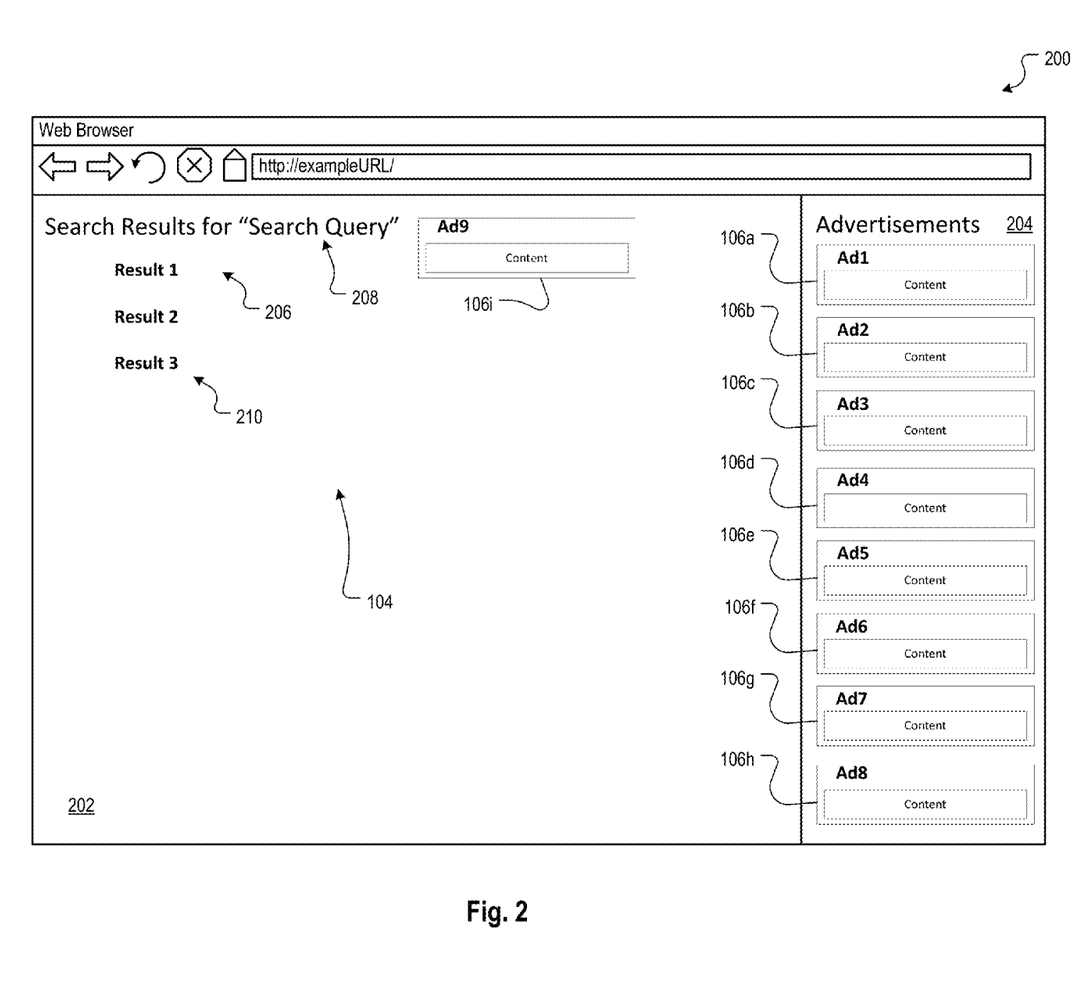
FIG. 2 is an example of a web browser displaying online content, including advertisements.

FIG. 2 is an example of a web browser 200 displaying online content, including advertisements. For example, the web browser 200 can be an example of the web browser 118 shown in FIG. 1 as a component of the online environment 100. The way in which the web browser 200 displays information and other conditions related to the use of the web browser 200 or the advertisement itself can affect the accuracy of a prediction value 113. The conditions may be conditions associated with the web browser 200, conditions associated with the online environment of the web browser 200, conditions associated with a user of the web browser 200, or other conditions that affect the likelihood that an advertisement will be clicked.

The web browser 200 includes a browsing portion 202 for displaying requested content (e.g., a web page 104 or search results presented in response to a user-entered query) and an advertisement portion 204, e.g., for displaying advertisements 106a-106h related to the web page or search request. In the example shown, the web page 104 is a presentation of search results 206 representing references (e.g., hyperlinks to uniform resource locators) to other web pages selected by a search engine (not shown) to be related to a search query 208 ("Search Query") previously entered by a user of the web browser 200. For example, the advertisements 106a-106h may have been identified (e.g., by an advertisement server 110 as shown in FIG. 1) in response to the particular content displayed within the web page 104. For example, the advertisements 106a-106h may be related to the search results 206.

In some implementations, advertisements can appear in multiple locations within the web browser 200. For example, in addition to advertisements 106a-h displayed along an advertisement portion 204 on the right-hand side of the web browser 200, other advertisements 106i can be displayed in the browsing portion 202 in an upper area of the web browser 200. In some examples, advertisements are displayed in a lower area of the web browser 200 or on the left-hand side of the web browser 200. In some examples, advertisements are displayed in-line with text displayed in the web browser 200.

The likelihood that any of the advertisements 106a-106i will be clicked on by a user of the web browser 200 may be recorded in prediction values (e.g., prediction values 113 as shown in FIG. 1). Also, a user's interaction with these advertisements 106a-106i may be used as data (e.g., data 111 as shown in FIG. 1) to calculate prediction values or improve the accuracy of the prediction values. However, the probability that any of these advertisements 106a-106i will be clicked may be affected by conditions associated with the web browser 200, conditions associated with the online environment of the web browser 200, conditions associated with a user of the web browser 200, or other conditions that affect the likelihood that an advertisement will be clicked.

For example, one such condition could be the country in which the advertisement is displayed. Users in some countries may be more likely to click on certain online advertisements, while users in other countries may be less likely to click on the same online advertisements.

Another such condition could be the location within a Web page at which the advertisement is displayed. For example, if an advertisement 106a is displayed in the advertisement portion 204 of the web browser 200, then the advertisement may be less likely to be clicked on than an advertisement 106i displayed in the browsing portion 202 of the web browser 200.

Another such condition could be the time of day at which the online advertisement is displayed. For example, an advertisement may be less likely to clicked on in the morning, and more likely to be clicked on in the evening.

Another such condition could be a characteristic of the text of the online advertisement. For example, an advertisement containing proper nouns may be more likely to be clicked on than an advertisement containing no proper nouns. In another example, an advertisement containing at least one French word may be more likely to be clicked on than an advertisement containing no French words.

Another such condition could be a characteristic of search results associated with the particular advertisement. For example, if the search results 206 returned by the search query 208 are highly relevant to the search query 208, the advertisements 106a-106i may be more likely to be clicked on by a user than if the search results 206 returned by the search query 208 are less relevant to the search query 208. This may occur, for example, if highly relevant search results are of greater interest to a user than less relevant search results, and advertisements associated with the highly relevant search results are also of greater interest to the user due to their relationship with the highly relevant search results.

Another such condition could be whether keywords used in a search query 208 are an exact match to search results 206 returned by the search query 208. In some examples, the search results 206 returned are relevant to the search query 208, but the search results 206 do not contain all of the exact keywords used in the search query 208. Advertisements 106a-106i may be less likely to be clicked on by a user if the search results 206 do not contain all of the exact keywords used in the search query 208, and the degree to which they are likely to be clicked on may exhibit bias or skew.

Another such condition could be the location within displayed search results 206. In some examples, search results 206 are displayed over multiple pages, e.g., multiple web pages 104. Advertisements 106a-106i may be more likely to be clicked on by a user if the user is viewing the first page of search results 206, and less likely to be clicked on by the user if the user is viewing a later page of search results 206. The degree to which they are likely to be clicked on may exhibit bias or skew.

Another such condition could be a characteristic of a particular user viewing an advertisement. For example, information may be known about a user, such as information entered by the user into an online profile of the user. Different characteristics about the user may tend to bias or skew a prediction of whether the user will click on advertisements 106a-106i.

Figure 3:
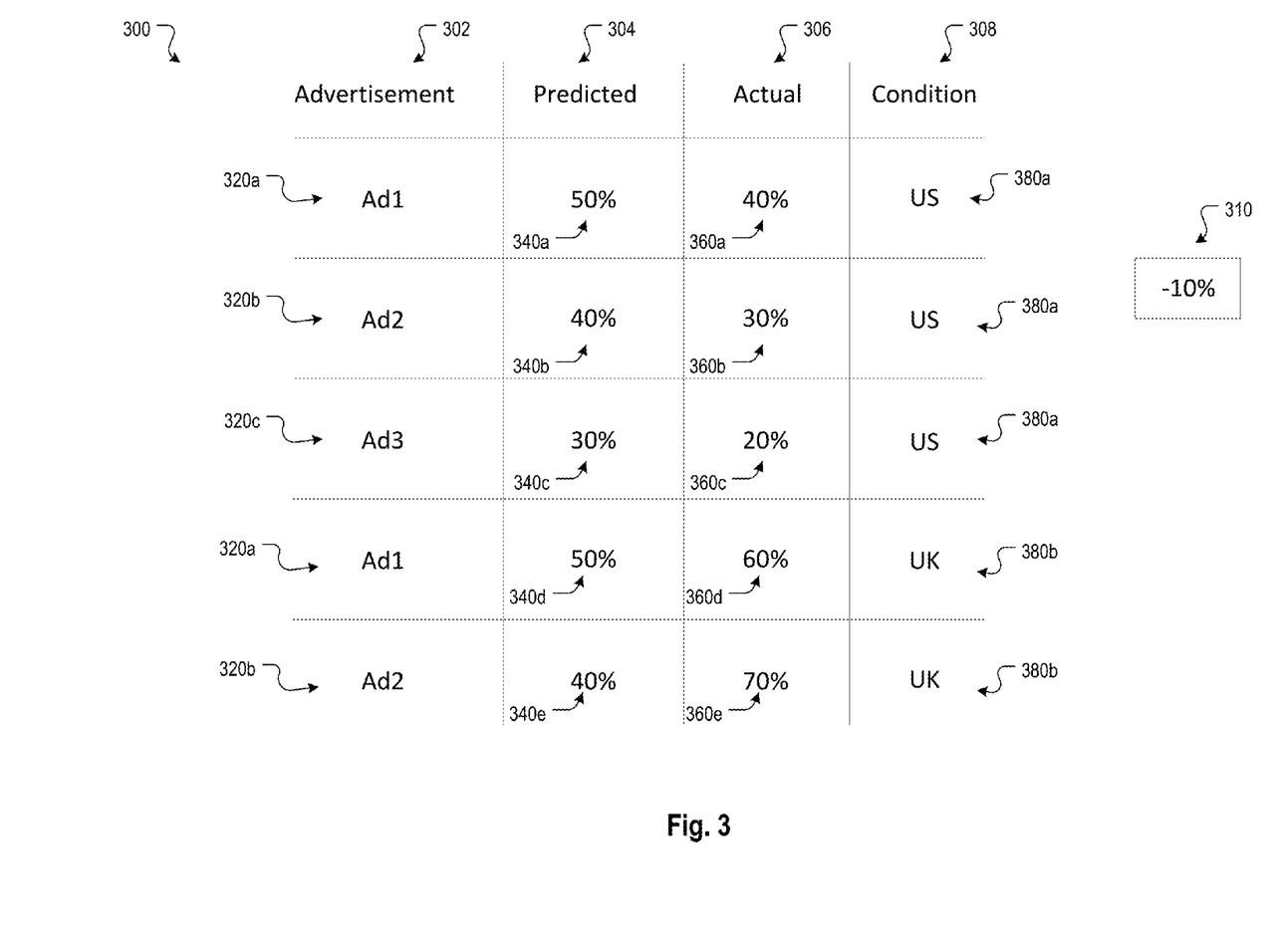
FIG. 3 is an exemplary table of advertisements.

FIG. 3 is an exemplary table 300 of advertisements. For example, the table 300 could represent data stored by an advertisement service such as statistics 112 stored by the advertisement service 114 shown in FIG. 1. The table 300 lists the advertisements 302, prediction values 304 that indicate a probability that an advertisement will be accessed by a user (e.g., clicked), actual click-through rates 306 that indicate what percentage of advertisements displayed to users were accessed by users, and conditions 308 present when the actual click-through rates 306 were determined or measured. For example, the actual click-through rates 306 could be determined by analyzing data 111 received by an advertisement service 114 and stored in advertisement statistics 112, as shown in FIG. 1.

The table 300 includes information relating to three advertisements 320a-320c. In this example, the particular condition 308 identified is the country where a user was viewing the advertisements 302 when the actual click-through rates 306 were determined or measured.

In this example, when the condition 308 is "US" 380a (United States), the actual click-through rates 360a-360c associated with the advertisements 320a-320c are ten percent lower than the prediction values 340a-340c associated with the same respective advertisements 320a-320c. Thus, when the condition 308 is "US" 380a then the actual click-through rates 360a-360c have a bias of 10% lower than the prediction values 340a-340c. For example, individuals in the United States may be less likely to click on advertisements than individuals in other parts of the world. Based on this information, the prediction values 340a-340c can be shifted down by 10% to better predict the actual click-through rate of an advertisement displayed in the United States. For example, an advertisement service 114 (FIG. 1) could store a shift value 310 of −10% in association with the prediction values 340a-340c. The shift value 310 can then be used with prediction values used to predict click-through rates in the United States.

In this example, when the condition 308 is "UK" 380b (United Kingdom), the actual click-through rates 360d-360e associated with the advertisements 320a-320b are higher than the prediction values 340d-340e associated with the same respective advertisements 320a-320b. In addition, the actual click-through rates 360d-360e are not higher by a particular quantity. Instead, the actual click-through rates 360d-360e are dependent on the value of the respective associated prediction values 340d-340e. For example, when the prediction value 340d is 50% then the actual click-through rate 360d is 10% higher than the prediction value. When the prediction value 340e is 40% then the actual click-through rate 360d is 30% higher than the prediction value.

Based on this information, the prediction values 340d-340e can be shifted up to better predict the actual click-through rate of an advertisement displayed in the United Kingdom. For example, an advertisement service 114 (FIG. 1) could store a shift value in association with the prediction values 340d-340e. The shift value may take the form of an equation containing a variable representing the prediction value to adjust, and containing a coefficient, for example, a coefficient determined by regression analysis. The shift value can then be used with prediction values used to predict click-through rates in the United Kingdom.

Thus, when the condition 308 is "UK" 380d then the actual click-through rates 360d-360e have a skew, which is a bias that depends on the value of the respective prediction values 340d-340e. For example, individuals in the United Kingdom may be more likely to click on advertisements that individuals in other parts of the world are unlikely to click on. Based on this information, the prediction values 340a-340c can be shifted to better predict the actual click-through rate of an advertisement displayed in the United Kingdom. A prediction value 304 can be shifted to account for both bias and skew (equation 1).

Equation 1 uses two shift values, f1 which shifts the prediction value by a quantity independent of the prediction value, and f2 which shifts the prediction value by a quantity that depends upon a quantity of the prediction value. In some examples, the values of f1 and f2 can be calculated by performing regression analysis on a graph of the prediction values as compared to actual click-through rates. For example, a regression analysis such as a Poisson regression could be used.

$$X\_corrected = X * e^{f_1} * X^{f_2}$$ Equation 1

(X: prediction value; X_corrected: prediction value account for bias and skew; f1: shift value for correcting for bias; f2: shift value for correcting for skew)

Figure 4:
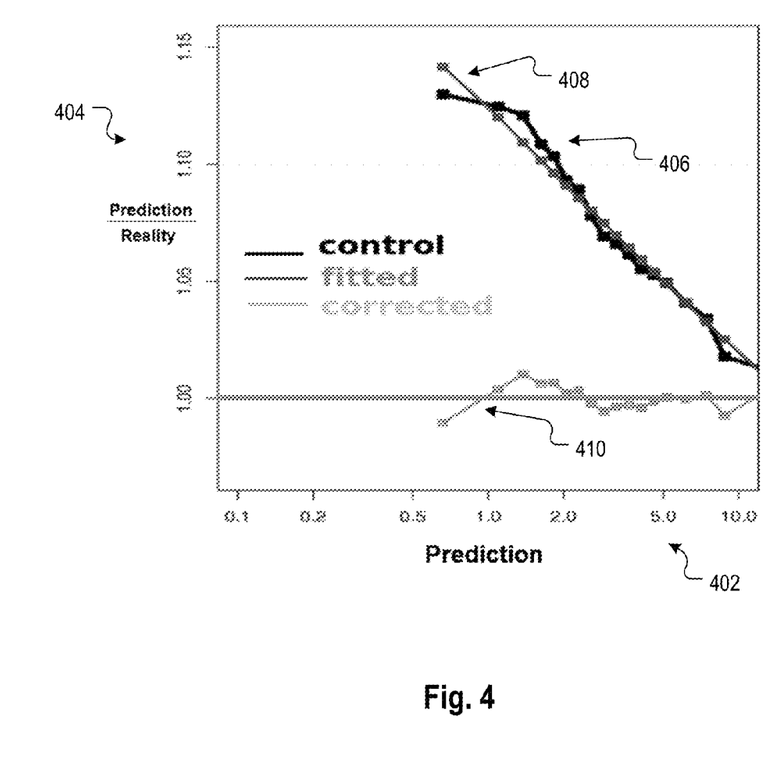
FIG. 4 is an exemplary chart of prediction values and the ratio between the prediction values and actual measured click-through rates.

FIG. 4 is an exemplary chart 400 of prediction values 402 and the ratio 404 between the prediction values and actual measured click-through rates. The chart 400 shows information about multiple advertisements. Each data point represents an advertisement, and the location of each point depends on a prediction value associated with one of the advertisements. The ratio 404 indicates the accuracy of a prediction value for an advertisement relative to a corresponding actual measured click-through rate for the advertisement. A ratio 404 of 1.0 indicates that the prediction value is exactly the same as the corresponding actual measured click-through rate, and so the prediction value can be considered to be accurate in predicting the actual measured click-through rate. A ratio 404 of less than 1.0 indicates that the prediction value predicts a click-through rate lower than the actual measured click-through rate, and so the prediction value can be considered to be pessimistic. A ratio 404 of greater than 1.0 indicates that the prediction value predicts a click-through rate higher than the actual measured click-through rate, and so the prediction value can be considered to be optimistic.

One set of data points 406 shows that the prediction values have a ratio 404 to actual measured click-through rates of higher than 1.0, indicating that the actual measured click-through rates are lower than the corresponding prediction values. The set of data points 406 is characterized by a higher ratio of prediction values to actual measured click-through rates when the prediction values are low. As the prediction values within the set of data points 406 increase, the ratio of prediction values to actual measured click-through rates decreases. A regression analysis can generate a fitted curve 408 which defines this correlation in a way that can be represented by a set of shift values. For example, the fitted curve 408 could be defined by values determined by regression analysis, for example, values such as f1 and f2 as shown above in equation 1.

In some implementations, the set of data points 406 will be determined at least partially by values of X in equation 1, where X represents a prediction value. The fitted curve can be used to determine values of f1 and f2. A new set of corrected data points 410 can be generated by applying equation 1 to values of X and generating values of X_corrected. The corrected set of data points 410 is therefore based on values of X_corrected. As shown in FIG. 4, the corrected set of data points 410 exhibits a ratio of prediction values to actual measured click-through rates of about 1.0. The ratio varies between 0.99 and 1.01, indicating that the prediction values of the corrected set of data points 410 are optimistic or pessimistic by about 1% compared to actual measured click-through rates. By comparison, the prediction values of the set of data points 406 were optimistic by as much as 13%. This indicates that the corrected prediction values corresponding to the values of X_corrected are very close to actual measured click-through rates. Thus, the corrected set of data points 410 has been corrected for bias and skew present in the original set of data points 406.

Figure 5A:
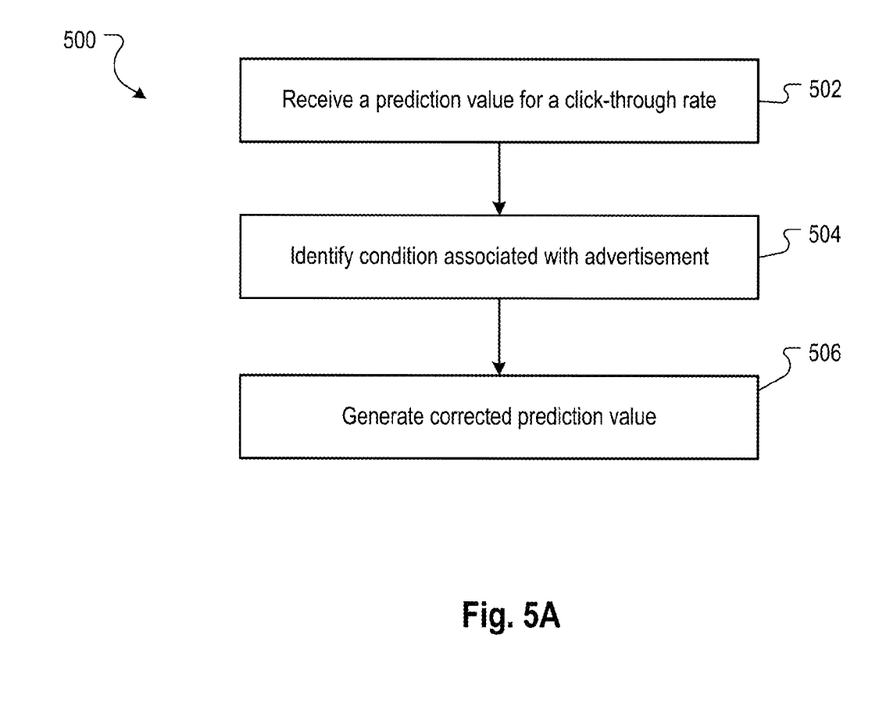
FIG. 5A is a flowchart of an exemplary process for adjusting prediction values based on bias and skew.

FIG. 5A is a flowchart of an exemplary process 500 for adjusting prediction values based on bias and skew. The process 500 can be used, for example, by the advertisement service 114 of FIG. 1 to correct or modify prediction values 113 associated with advertisement statistics 112.

At stage 502, the advertisement service receives a prediction value for a click-through rate. For example, the prediction value can indicate a probability that an online advertisement will be accessed when displayed to users. The prediction value can be based on a ratio of a number of times the advertisement has been accessed by users to a number of times the advertisement has been displayed to users.

At stage 504, the advertisement service identifies at least one condition that is present when the online advertisement is to be displayed in an online medium. For example, the condition could be a condition affecting an actual click-through rate relative to the prediction value. Some examples of such a condition are a physical location that the online advertisement is displayed in, a location within a web page that the online advertisement is displayed at, a time of day at which the online advertisement is displayed, a characteristic of the text of the online advertisement, a characteristic of search results associated with the particular advertisement, and relevance of the advertisement to a keyword used in a search query.

At stage 506, the advertisement service generates a corrected prediction value based on at least one stored shift value (a value for correcting the accuracy of a prediction value relative to an actual click-through rate) associated with the at least one condition. For example, the advertisement service can calculate a corrected prediction value by applying an equation that takes into account at least one of bias and skew caused by the condition and uses the shift value (or values) in calculating the corrected prediction value.

Figure 5B:
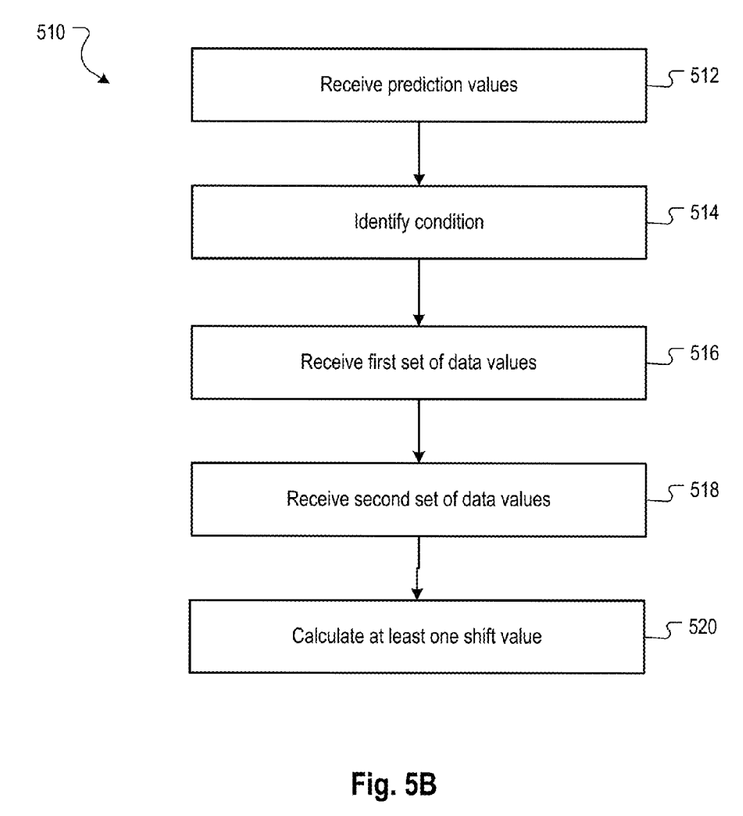
FIG. 5B is a flowchart of an exemplary process for calculating shift values for adjusting prediction values based on bias and skew.

FIG. 5B is a flowchart of an exemplary process 510 for calculating shift values for adjusting prediction values based on bias and skew. The process 510 can be used, for example, by the advertisement service 114 of FIG. 1 to calculate values such as f1 and f2 (equation 1) based on data 111 received from a network 108.

At stage 512, the advertisement service receives a set of a prediction values each for predicting a click-through rate. For example, the prediction values can indicate a probability that an online advertisement will be accessed when displayed to users. The prediction values can be based on a measured click-through rate when the corresponding online advertisement was displayed in an online medium.

At stage 514, the advertisement service identifies at least one condition present when the online advertisements were displayed. For example, the condition could be a condition affecting an actual click-through rate relative to the prediction value. Some examples of such a condition are a physical location at which the online advertisement is displayed, a location within a web page at which that the online advertisement is displayed, a time of day at which the online advertisement is displayed, a characteristic of the text of the online advertisement, a characteristic of search results associated with the particular advertisement, and relevance of the advertisement to a keyword used in a search query.

At stage 516, the advertisement service receives a first set of data values each indicating a number of times the advertisements have been accessed (e.g., clicked on) by users when the condition or conditions occur. For example, the data values may be collected by an advertisement server 110 (FIG. 1) based on the way users 101 interact with a web browser 118.

At stage 518, the advertisement service receives a second set of data values each indicating a number of times the advertisements have been displayed to users when the condition or conditions occur. For example, the data values may be collected by an advertisement server 110 (FIG. 1) based on the way the advertisement server 110 has provided advertisements 106 to a web browser 118 for viewing by a user 101.

At stage 520, the advertisement service calculates at least one shift value for adjusting prediction values when the condition is present. The shift value can be calculated based on the prediction values, the first set of data values, and the second set of data values. The ratio of the sets of data values (e.g., a ratio of clicks to impressions for advertisements) represents an actual click-through rate for advertisements when the condition is present. The prediction values may exhibit bias and skew when this condition is present. For example, the advertisement service can perform a regression analysis to generate one or more shift values that can be applied to an equation for calculating corrected prediction values based on the uncorrected prediction values. The shift value or values can be used to correct bias and skew in any other prediction values at a later time, for example, using the process 500 shown in FIG. 5A.

Figure 6:
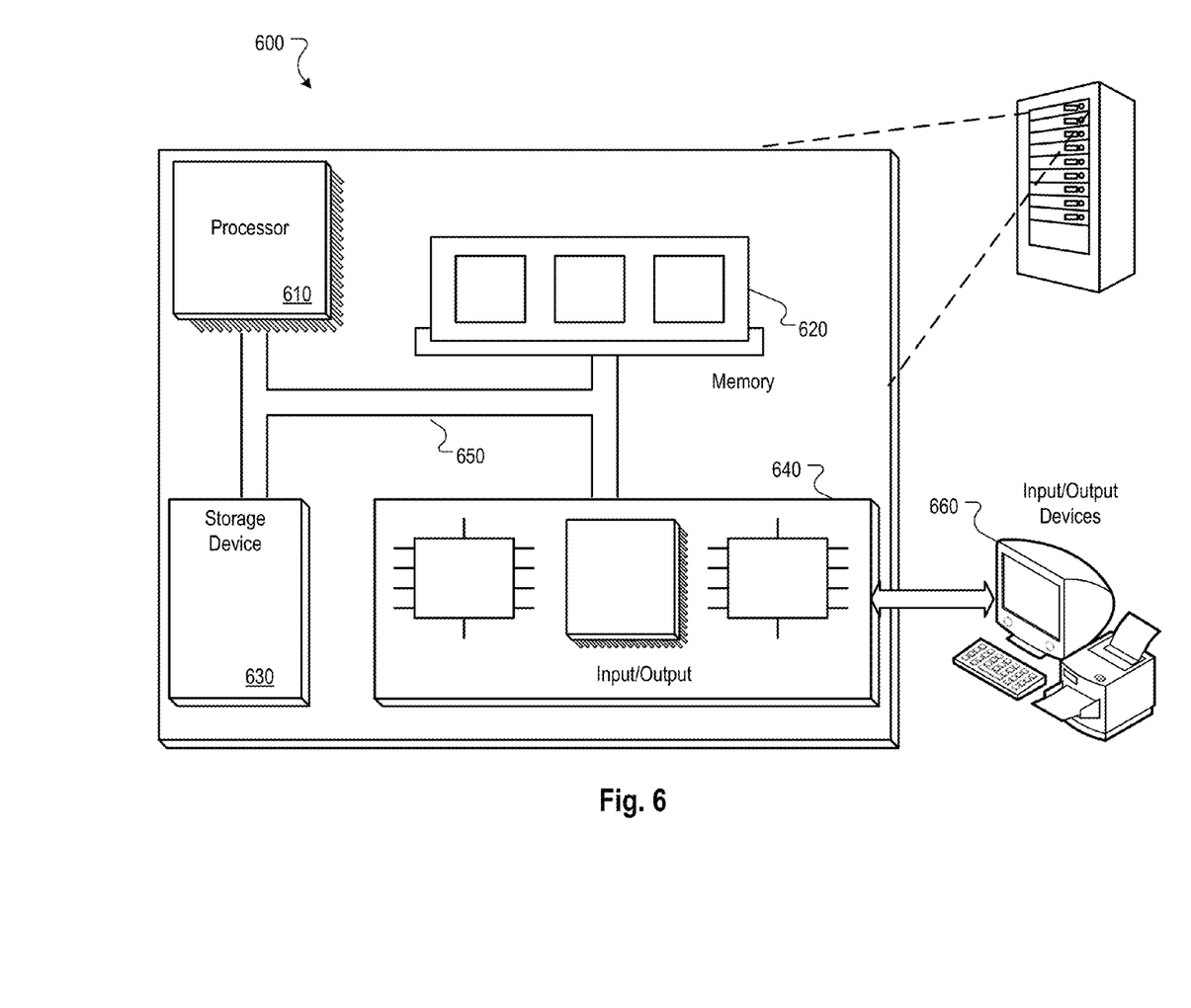
FIG. 6 is block diagram of an exemplary computer system that can be used to facilitate the display of advertisements.

FIG. 6 is block diagram of an exemplary computer system 600 that can be used to facilitate the correction of bias and skew. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can include, for example, a hard disk device, an optical disk device, or some other large capacity storage device.

The input/output device 640 provides input/output operations for the system 600. In one implementation, the input/output device 640 can include one or more of a network interface devices, e.g., an Ethernet card, a serial communication device, e.g., an RS-232 port, and/or a wireless interface device, e.g., and 802.11 card. In another implementation, the input/output device can include driver devices configured to receive input data and send output data to other input/output devices, e.g., keyboard, printer and display devices 660. Other implementations, however, can also be used, such as mobile computing devices, mobile communication devices, set-top box television client devices, etc.

The web server, advertisement server, and content aggregator can be realized by instructions that upon execution cause one or more processing devices to carry out the processes and functions described above. Such instructions can comprise, for example, interpreted instructions, such as script instructions, e.g., JavaScript or ECMAScript instructions, or executable code, or other instructions stored in a computer readable medium. The web server and advertisement server can be distributively implemented over a network, such as a server farm, or can be implemented in a single computer device.

Although an example processing system has been described in FIG. 7, implementations of the subject matter and the functional operations described in this specification can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier, for example a computer-readable medium, for execution by, or to control the operation of, a processing system. The computer readable medium can be a machine readable storage device, a machine readable storage substrate, a memory device, a composition of matter effecting a machine readable propagated signal, or a combination of one or more of them.

The term "processing system" encompasses all apparatus, devices, and machines for processing data, including by way of example a programmable processor, a computer, or multiple processors or computers. The processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

Implementations of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method comprising:
   receiving, by one or more computers, a prediction value for a click-through rate for an online advertisement, the prediction value indicating a probability that the online advertisement will be accessed when displayed in an online medium, the prediction value based on a ratio of a number of times the online advertisement has been accessed by users to a number of times the online advertisement has been displayed to users;

identifying, by the one or more computers, at least one condition that is present when the online advertisement is to be displayed, the at least one condition affecting accuracy of the prediction value;

determining a bias value based on the identified at least one condition;

determining a skew value based on the prediction value; and generating, using an exponential function, a corrected prediction value based on at least the bias value, the skew value, and the prediction value.

2. The method of claim 1, wherein the exponential function includes a quantity comprising a constant base raised to the bias value.

3. The method of claim 1, wherein the exponential function includes a quantity comprising a base of the prediction value raised to the skew value.

4. The method of claim 1, wherein:
the online advertisement comprises a hyperlink;
the probability that the online advertisement will be accessed comprises a probability that the hyperlink will be clicked; and
the number of times the online advertisement has been accessed by users comprises the number of times the online advertisement has been clicked by users.

5. The method of claim 1, wherein the generating the corrected prediction value comprises adjusting the prediction value based on (i) a shift value for correcting bias based on an exponential of the bias value, and (ii) a shift value for correcting skew based on the skew value.

6. The method of claim 5, wherein the adjusting the prediction value (X) comprises calculating a new prediction value (X_corrected) using the following equation:

$$X\_corrected = X * e^{f_1} * X^{f_2}$$

wherein $e^{f_1}$ is the shift value for correcting bias and $X^{f_2}$ is the shift value for correcting skew.

7. The method of claim 1, wherein the at least one condition comprises at least one of a physical location at which the online advertisement is displayed, a location within a web page at which the online advertisement is displayed, a time of day at which the online advertisement is displayed, a characteristic of text of the online advertisement, a characteristic of search results associated with the online advertisement, and relevance of the online advertisement to a keyword used in a search query.

8. The method of claim 1, further comprising using determining, based on the corrected prediction value, to serve the online advertisement.

9. A system, comprising:
a data processing apparatus; and
a memory coupled to the data processing apparatus having instructions stored thereon which, when executed by the data processing apparatus cause the data processing apparatus to perform operations comprising:
receiving a prediction value for a click-through rate for an online advertisement, the prediction value indicating a probability that the online advertisement will be accessed when displayed in an online medium, the prediction value based on a ratio of a number of times the online advertisement has been accessed by users to a number of times the online advertisement has been displayed to users;

identifying at least one condition that is present when the online advertisement is to be displayed, the at least one condition affecting accuracy of the prediction value;

determining a bias value based on the identified at least one condition;

determining a skew value based on the prediction value; and generating, using an exponential function, a corrected prediction value based on at least the bias value, the skew value, and the prediction value.

10. The system of claim 9, wherein the exponential function includes a quantity comprising a constant base raised to the bias value.

11. The system of claim 9, wherein the exponential function includes a quantity comprising a base of the prediction value raised to the skew value.

12. The system of claim 9, wherein:
the online advertisement comprises a hyperlink;
the probability that the online advertisement will be accessed comprises a probability that the hyperlink will be clicked; and
the number of times the online advertisement has been accessed by users comprises the number of times the online advertisement has been clicked by users.

13. The system of claim 9, wherein the operation of generating the corrected prediction value comprises adjusting the prediction value based on (i) a shift value for correcting bias based on an exponential of the bias value, and (ii) a shift value for correcting skew based on the skew value.

14. The system of claim 13, wherein the operation of adjusting the prediction value (X) comprises calculating a new prediction value (X_corrected) using the following equation:

$$X\_corrected = X * e^{f_1} * X^{f_2}$$

wherein $e^{f_1}$ is the shift value for correcting bias and $X^{f_2}$ is the shift value for correcting skew.

15. The system of claim 9, wherein the at least one condition comprises at least one of a physical location at which the online advertisement is displayed, a location within a web page at which the online advertisement is displayed, a time of day at which the online advertisement is displayed, a characteristic of text of the online advertisement, a characteristic of search results associated with the online advertisement, and relevance of the online advertisement to a keyword used in a search query.

16. The system of claim 9, the operations further comprising determining, based on the corrected prediction value, to serve the online advertisement.

17. A non-transitory computer readable device storing software comprising instructions executable by a processing device and upon such execution cause the processing device to perform operations comprising:
receiving a prediction value for a click-through rate for an online advertisement, the prediction value indicating a probability that the online advertisement will be accessed when displayed in an online medium, the prediction value based on a ratio of a number of times the online advertisement has been accessed by users to a number of times the online advertisement has been displayed to users;

identifying at least one condition that is present when the online advertisement is to be displayed, the at least one condition affecting accuracy of the prediction value;

determining a bias value based on the identified at least one condition;

determining a skew value based on the prediction value; and generating, using an exponential function, a corrected prediction value based on at least the bias value, the skew value, and the prediction value.

18. The non-transitory computer readable device of claim 17, wherein the exponential function includes a quantity comprising a constant base raised to the bias value.

19. The non-transitory computer readable device of claim 17, wherein the exponential function includes a quantity comprising a base of the prediction value raised to the skew value.

20. The non-transitory computer readable device of claim 17, wherein:

the online advertisement comprises a hyperlink;

the probability that the online advertisement will be accessed comprises a probability that the hyperlink will be clicked; and the number of times the online advertisement has been accessed by users comprises the number of times the online advertisement has been clicked by users.

21. The non-transitory computer readable device of claim 17, wherein the operation of generating the corrected prediction value comprises adjusting the prediction value based on (i) a shift value for correcting bias based on an exponential of the bias value, and (ii) a shift value for correcting skew based on the skew value.

22. The non-transitory computer readable device of claim 21, wherein the operation of adjusting the prediction value (X) comprises calculating a new prediction value (X_corrected) using the following equation:

$$X\_corrected = X * e^{f1} * X^{f2}$$

wherein $e^{f1}$ is the shift value for correcting bias and $X^{f2}$ is the shift value for correcting skew.

23. The non-transitory computer readable device of claim 17, wherein the at least one condition comprises at least one of a physical location at which the online advertisement is displayed, a location within a web page at which the online advertisement is displayed, a time of day at which the online advertisement is displayed, a characteristic of text of the online advertisement, a characteristic of search results associated with the online advertisement, and relevance of the online advertisement to a keyword used in a search query.

24. The non-transitory computer readable device of claim 17, the operations further comprising determining, based on the corrected prediction value, to serve the online advertisement.

* * * * *

UNITED STATES PATENT AND TRADEMARK OFFICE
CERTIFICATE OF CORRECTION

PATENT NO. : 8,700,465 B1
APPLICATION NO. : 13/161195
DATED : April 15, 2014
INVENTOR(S) : Dan Liu et al.

It is certified that error appears in the above-identified patent and that said Letters Patent is hereby corrected as shown below:

In The Claims

Column 13, line 54, Claim 8, after "comprising" please delete "using".

Signed and Sealed this
Sixteenth Day of December, 2014

Michelle K. Lee
*Deputy Director of the United States Patent and Trademark Office*